No. 775,409. PATENTED NOV. 22, 1904.
R. SYMMONDS.
POWER TRANSMITTING AND REVERSING MECHANISM.
APPLICATION FILED APR. 9, 1904.
NO MODEL. 2 SHEETS—SHEET 1.
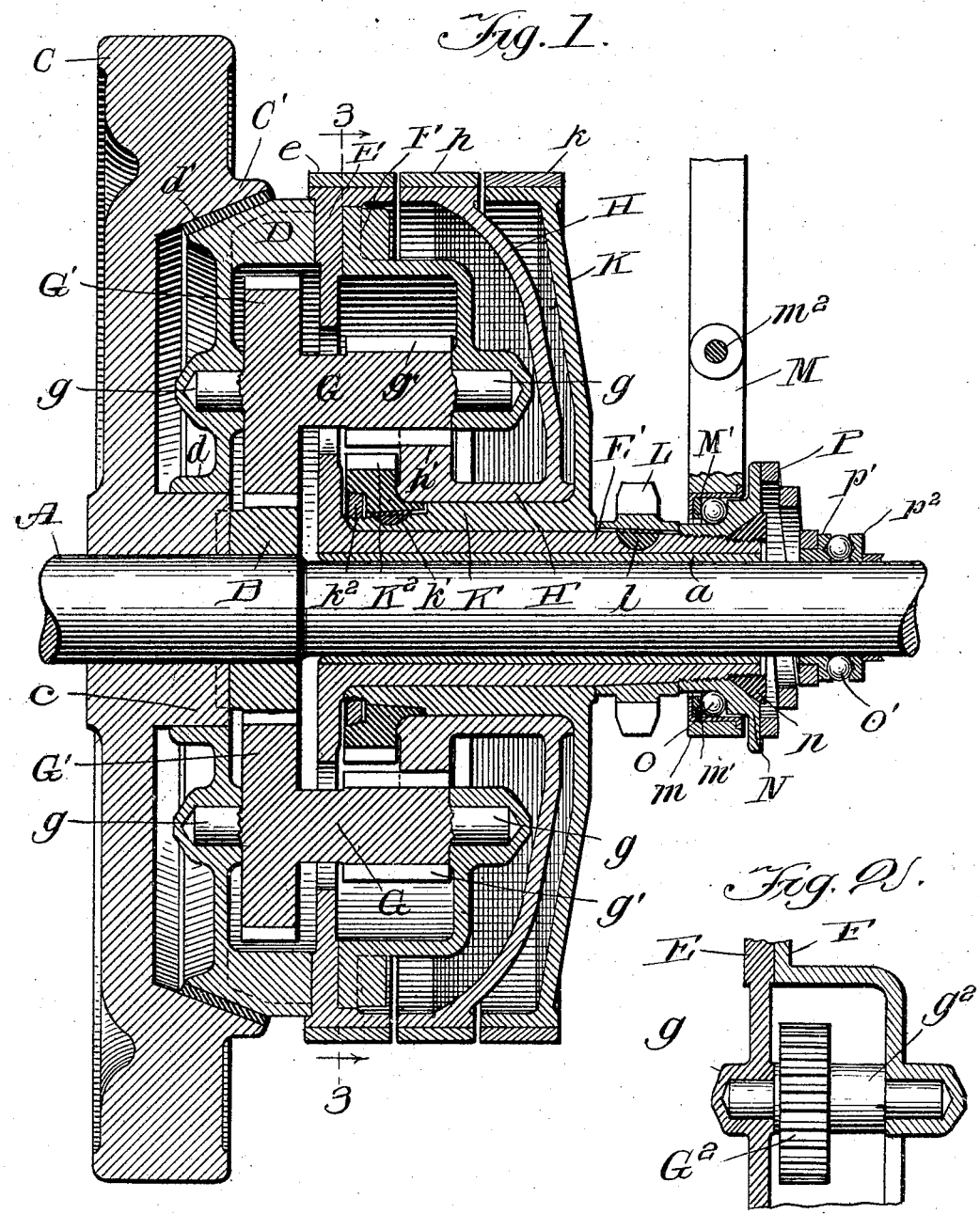

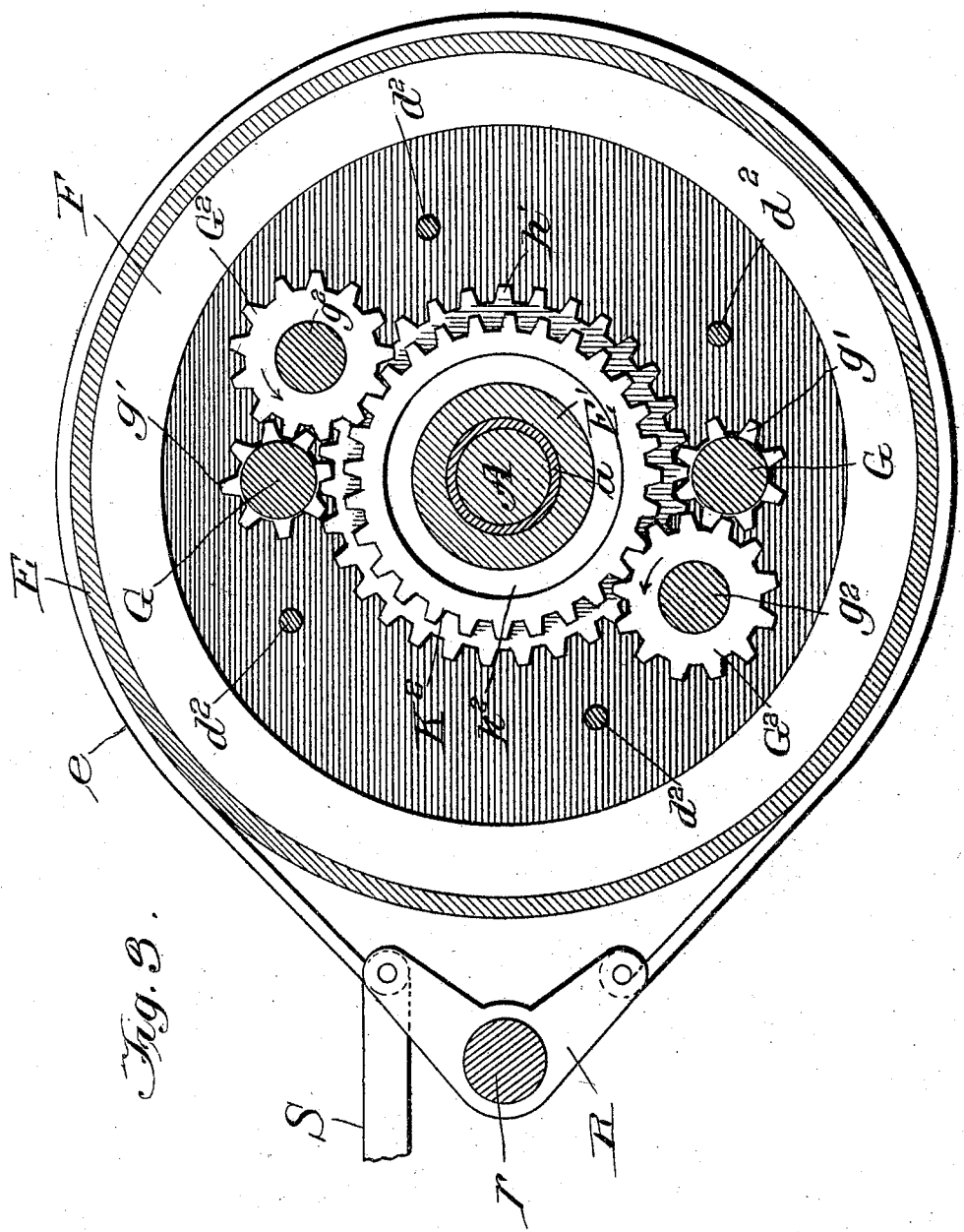

No. 775,409.                               Patented November 22, 1904.

UNITED STATES PATENT OFFICE.

ROBERT SYMMONDS, OF KENOSHA, WISCONSIN, ASSIGNOR TO THOMAS B. JEFFERY, OF KENOSHA, WISCONSIN.

POWER TRANSMITTING AND REVERSING MECHANISM.

SPECIFICATION forming part of Letters Patent No. 775,409, dated November 22, 1904.

Application filed April 9, 1904. Serial No. 202,469. (No model.)

*To all whom it may concern:*

Be it known that I, ROBERT SYMMONDS, a citizen of the United States, residing at Kenosha, county of Kenosha, State of Wisconsin, have invented a certain new and useful Improvement in Power Transmitting and Reversing Mechanism; and I declare the following to be a full, clear, and exact description of the invention, such as will enable others skilled in the art to which it pertains to make and use the same, reference being had to the accompanying drawings, which form a part of this specification.

My invention relates in general to power-transmission mechanism, and more particularly to differential gearing interposed between a motor and a driven element, whereby the latter may be rotated at various speeds in one direction or in a reverse direction.

It is desirable, especially in automobiles, to so connect the motor with a driven element, which in turn is operatively connected to the rear axle of the automobile, that the speed and power transmitted from the motor may be varied at the will of the operator and that the direction of rotation of the driven element may be reversed while the motor continues to run in the same direction.

The primary object of my invention is to provide transmission mechanism for connecting a motor to a driven element, which may be readily adjusted to inversely vary the speed and power of rotation of the element or to reverse the direction of rotation thereof.

A further object of my invention is to provide a differential transmission mechanism which will be simple in construction, inexpensive in manufacture, and efficient in operation.

My invention, generally described, consists in a shaft rotatively connected to a motor, a clutch member fixed upon the shaft, a second coöperating clutch member loosely surrounding the shaft, a driven element loosely supported upon the shaft and rigidly connected to the second clutch member, a rotary stub-shaft carried by the second clutch member having a gear-wheel thereon in mesh with a gear-wheel fixed to the driving-shaft, a sleeve loosely surrounding the driven element and having fixed thereto a concentric gear-wheel, the latter meshing with an idle gear carried by the second clutch member, a pinion fixed on the stub-shaft meshing with said idle gear, a second sleeve loosely surrounding the first sleeve and having fixed thereon a concentric gear in mesh with said pinion, means for separately controlling the rotation of said sleeves and said driven element, and means for moving the driven element axially upon the driving-shaft, thereby engaging and disengaging said clutch members.

My invention will be more fully described hereinafter with reference to the accompanying drawings, in which the same is illustrated as embodied in a convenient and practical form, and in which—

Figure 1 is a central longitudinal section, the clutch members being shown in engagement; Fig. 2, a detail sectional view showing the idle gear; and Fig. 3, a sectional view on line 3 3, Fig 1.

The same reference characters are used to designate the same parts in the several figures of the drawings.

Reference character A indicates a shaft which is rotated by any suitable power connections—such, for instance, as a direct connection with the engine of an automobile. B indicates a gear-wheel fixed upon the shaft A adjacent to a fly-wheel C, also fixed upon the shaft A.

C' indicates a clutch member rigidly carried by the shaft A and preferably formed integrally with the fly-wheel C. A second clutch member D concentrically surrounds the shaft A and is preferably provided with a hub $d$, within which extends the hub $c$ of the fly-wheel.

Loosely surrounding a shaft A is a driven element which may conveniently consist in a sleeve E', between which and a reduced portion of the shaft A is interposed a bushing $a$. A disk E is carried by and preferably formed integral with the inner end of the sleeve E' and is provided with a circular flange at its outer periphery, around which extends a brake-band $e$. An annular disk F, of substantially the same diameter as the clutch member D, is located within the circular flange on the disk E and is rigidly united to the disk E and clutch member D by any suitable means—such, for instance, as bolts $d^2$.

The clutch member D, disk E, and annular disk F constitute a carrier within which are journaled one or more stub-shafts G, the ends $g$ of which are rotatably mounted in bearings formed in the clutch member and annular disk F. A gear-wheel G' is fixed upon and preferably formed integral with each stub-shaft G and meshes with the gear-wheel B, fixed upon the driving-shaft A. Each stub-shaft G is also provided with a pinion $g'$, which meshes with a gear-wheel $h'$, carried at the inner end of a sleeve H', the latter being located concentrically around the sleeve E'. Interposed between the sleeves E' and H' is a sleeve K', the inner end of which has fixed thereon a gear-wheel $K^2$. Any suitable means may be provided for securing the gear-wheel $K^2$ upon the end of the sleeve K'—such, for instance, as a collar $k^2$ in screw-threaded engagement with the inner end of the sleeve and a key $k'$ for non-rotatively locking the gear-wheel upon the sleeve.

Journaled within the carrier composed of the clutch member D and disks E and F are idle gear-wheels $G^2$, one of which meshes with each pinion $g'$. Any suitable means may be provided for supporting the idle gear-wheel $G^2$—such, for instance, as rods $g^2$, the ends of which are journaled in bearings formed in the opposing surface of the disks E and F. The idle gears $G^2$ are also in mesh with the gear-wheel $K^2$, fixed upon the inner end of the sleeve K'. Fixed upon the outer ends of the sleeves H' and K' are radial disks H and K, the outer peripheries of which are provided with circular flanges surrounded by clutch-bands $h$ and $k$, respectively.

Concentrically surrounding and fixed upon the sleeve E' is a sprocket-wheel L or any other power-transmitting device. A key $l$ is shown as the means for non-rotatably securing the sprocket-wheel L upon the sleeve E'. The sprocket-wheel L serves to transmit the power from the driven element E' to the rear axle of an automobile or to other mechanism to which it is desired to communicate rotary motion.

N designates a disk concentrically surrounding the end of the sleeve E' and preferably secured thereon through a screw-threaded engagement therewith.

$n$ designates a locking-ring for securely retaining the disk N upon the end of the sleeve. Located adjacent to and surrounding the hub of the disk N is a yoke $m$, connected to which is an actuating-lever M. Located within the yoke $m$ is a lining of tough metal M', spaced apart from the disk N to form a raceway in which are located ball-bearings $o$.

$m'$ designates a washer of tough metal located within the inwardly-extending radial flange of the lining M' to assume the wear of the ball-bearings.

Fixed upon the shaft A, near the right thereof, in Fig. 1 is a collar $p^2$, between which and a coöperating collar $p'$, loosely surrounding the shaft A, are located ball-bearings $o'$. Interposed between the loose collar $p'$ and disk N is a spring P, the tension of which forces the clutch member D into engagement with the coöperating clutch member C', a leather or other wearing-surface $d'$ being preferably interposed between the coöperating surfaces of the clutches.

Suitable means are provided for causing the respective brake-bands $e$, $h$, and $k$ to tightly grip the circular flanges which they surround, and thereby retard the rotation of the disks and sleeves united thereto, which loosely concentrically surround the driving-shaft. In Fig. 3 I have shown as a means for causing the brake-band $e$ to grip the circular flange on the disk E as consisting in a bell-crank lever R, fulcrumed upon a rod $r$ to the ends of the arms of which the ends of the band are connected. S indicates a suitable connection for oscillating the bell-crank lever and thereby tightening the band around the flange. Similar mechanism (not shown) may be provided for actuating the bands $h$ and $k$.

The operation of my invention is as follows: The shaft A is rotated through its connection with the motor, and with it rotates the fly-wheel C and gear-wheel B. When it is desired to connect the driven element E' directly to the driving-shaft, the lever M is so actuated as to permit the spring P to expand, thereby moving the sleeve E' and the mechanism surrounding the same toward the fly-wheel C and forcing the movable clutch member D into frictional engagement with the clutch C'. The engaging surfaces of the clutches are preferably conical, as shown, to insure the clutch members being tightly locked together by the tension of the spring. When it is desired to rotate the driven element at a slower speed than that at which the driving-shaft A rotates, the lever M is so actuated—as, for instance, by swinging the same about its fulcrum $m^2$—that the yoke $m$ will move toward the right in Fig. 1, thereby through the interposed ball-bearings moving the disk N against the tension of the spring P and disengaging the clutch member D from the clutch member C', owing to the axial movement of the sleeve E', to which the clutch member D is rigidly secured. The band $k$ is then tightened about the circular flange at the periphery of the disk K, so as to lock the same against rotation. The rotation of the driving-shaft A through the meshed gear-wheels B and G' rotates the stub-shaft G and with it the pinion $g'$. The pinion $g'$ rotates the idle gear-wheel $G^2$ in the direction of the arrow, (indicated in Fig. 3,) and as the gear-wheel $K^2$, which meshes with the idle gear-wheel $G^2$, is held immovable the carrier for the stub-shafts, comprising the clutch member D, disks E and F, is rotated in the direction of rotation of the driving-shaft, but at a less speed, owing to the relative sizes of the interposed gear-wheels and pinion. The driven element, consisting in the sleeve E', is consequently rotated, and it in turn rotates the sprocket-wheel L and mechanism connected thereto. When it is desired to rotate the driven element in a reverse direction to that in which the driving-shaft rotates, the clutch members are disengaged by actuating the lever M, and the band $h$ is tightened around the circular flange on the disk H, so as to hold the latter against rotation. The stub-shafts G are rotated through the meshed gear-wheels B and G', and as the gear-wheel $h'$, with which the pinion $g'$ on the stub-shafts mesh, carried by the sleeve H', is held immovable the carrier of the stub-shafts is rotated in an opposite direction to the rotation of the driving-shaft A. The driving element E', which is rigid with the carrier on the stub-shafts, is consequently rotated in an opposite direction to the rotation of the driving-shaft, and such reverse rotation is imparted, through the sprocket-wheel L, to the driven mechanism. The rotation of the driven element may be retarded by tightening the band $e$ around the circular flange on the disk E, and through the sprocket-wheel L the rotation of the driven mechanism is also retarded.

From the foregoing description it will be observed that I have invented an improved transmission-gearing in which the driven element may be directly connected to the rotating power-shaft, in which the driven element may also be connected to the power-shaft through interposed speed-reducing gearing and in which the driven element may be driven in a reverse direction to that of the rotating shaft, such different movements of the driven element being easily effected by extremely simple mechanical means.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a power-transmission mechanism, the combination with a driving element, of a clutch fixed thereto, a coöperating movable clutch member, a driven element, a casing carried by the movable clutch member, and gearing mechanism inclosed in said casing operatively connecting the driving and driven elements.

2. In a power-transmission mechanism, the combination with a driving element, of a clutch member fixed thereto, a coöperating movable clutch member, a driven element, a gear-wheel fixed to the driving element, a casing carried by the movable clutch member, and gearing mechanism inclosed in said casing and interposed between said gear-wheel and said driven element.

3. In a power-transmission mechanism, the combination with a driving element, of a clutch member fixed thereto, a coöperating movable clutch member, a driven element rigidly secured to said movable clutch member, a stub-shaft carried by the movable clutch member, a gear-wheel fixed upon said stub-shaft, a gear-wheel fixed to the driving element in mesh with the gear-wheel on the stub-shaft, a pinion fixed to the stub-shaft, an idle gear carried by the movable clutch member and meshing with said pinion, a gear-wheel located concentrically with respect to the movable clutch member in mesh with said idle gear, and means for locking said last-mentioned gear-wheel against rotation.

4. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a gear-wheel rotatively located concentrically around the driven sleeve and meshing with said idle gear, and means for locking said last-mentioned gear-wheel against rotation.

5. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a second sleeve loosely surrounding said driven sleeve, a gear-wheel fixed to said second sleeve in mesh with said idle gear, and means for locking said second sleeve against rotation.

6. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a second sleeve loosely surrounding said driven sleeve, a gear-wheel fixed to said second sleeve in mesh with said idle gear, a third sleeve loosely surrounding said second sleeve, a gear-wheel fixed to said third sleeve in mesh with said pinion, and means for separately locking said second and third sleeves against rotation.

7. In a power-transmission mechanism, the combination with a driving element, of a clutch member fixed thereto, a coöperating movable clutch member, a stub-shaft carried by the movable clutch member, a gear-wheel fixed upon said stub-shaft, a gear-wheel fixed to the driving element in mesh with the gear-wheel on the stub-shaft, a pinion fixed to the stub-shaft, an idle gear carried by the movable clutch member and meshing with said pinion, a gear-wheel located concentrically with respect to the movable clutch member in mesh with said idle gear, means for locking said last-mentioned gear-wheel against rotation, and a casing carried by the movable clutch member inclosing the stub-shaft, pinion, and gear-wheels.

8. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a gear-wheel rotatively located concentrically around the driven sleeve and meshing with said idle gear, means for locking said last-mentioned gear-wheel against rotation, and a casing carried by the movable clutch member inclosing said gear-wheels, stub-shaft and pinion.

9. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a second sleeve loosely surrounding said driven sleeve, a gear-wheel fixed to said second sleeve in mesh with said idle gear, means for locking said second sleeve against rotation, and a casing carried by the movable clutch member inclosing said gear-wheels, stub-shaft and pinion.

10. In a power-transmission mechanism, the combination with a driving-shaft, of a clutch member fixed on said shaft, a coöperating movable clutch member, a driven sleeve loosely surrounding said shaft and rigidly secured to the movable clutch member, a stub-shaft carried by the movable clutch member, a gear fixed upon said stub-shaft, a gear-wheel fixed to the driving-shaft in mesh with the gear on the stub-shaft, a pinion fixed to the stub-shaft, an idle gear carried by the movable clutch member and meshing with said pinion, a second sleeve loosely surrounding said driven sleeve, a gear-wheel fixed to said second sleeve in mesh with said idle gear, a third sleeve loosely surrounding said second sleeve, a gear-wheel fixed to said third sleeve in mesh with said pinion, means for separately locking said second and third sleeves against rotation, and a casing carried by the movable clutch member inclosing said gear-wheels, stub-shaft and pinion.

11. In a power-transmission mechanism, the combination with a driving element, of a clutch member fixed thereto, a coöperating movable clutch member, a driven element, a casing rigidly secured to said movable clutch member, a radial disk fixed to said driven element and interposed between and rigidly secured to the movable clutch member and said casing, and gearing mechanism inclosed in said casing operatively connecting the driving and driven elements.

In testimony whereof I sign this specification in the presence of two witnesses.

ROBERT SYMMONDS.

Witnesses:
H. W. JEFFERY,
G. H. EDDY.